United States Patent
Brandt et al.

(10) Patent No.: US 6,708,504 B2
(45) Date of Patent: Mar. 23, 2004

(54) COOLING OF EXTRUDED AND COMPRESSION MOLDED MATERIALS

(75) Inventors: Jeffrey R. Brandt, Blacklick, OH (US); Matthew F. Kollar, Powell, OH (US); Herbert L. Hutchison, Blacklick, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

(21) Appl. No.: 10/025,432

(22) Filed: Dec. 19, 2001

(65) Prior Publication Data

US 2002/0166327 A1 Nov. 14, 2002

Related U.S. Application Data

(63) Continuation-in-part of application No. 09/766,054, filed on Jan. 19, 2001.

(51) Int. Cl.[7] .............................................. F25D 13/06
(52) U.S. Cl. .............................................. 62/63; 62/64
(58) Field of Search ..................... 62/62, 63, 64, 62/304

(56) References Cited

U.S. PATENT DOCUMENTS

| | | | |
|---|---|---|---|
| 2,010,207 A | 8/1935 | Topham et al. | 18/15 |
| 2,188,396 A | 1/1940 | Semon | 18/55 |
| 2,489,373 A | 11/1949 | Gilman | 260/37 |
| 2,514,471 A | 7/1950 | Calhoun | 18/8 |
| 2,519,442 A | 8/1950 | Delorme et al. | 260/37 |

(List continued on next page.)

FOREIGN PATENT DOCUMENTS

| | | |
|---|---|---|
| DE | 2042176 | 4/1971 |
| DE | 3801574 | 8/1989 |
| DE | 4033849 | 10/1990 |
| DE | 4221070 | 12/1993 |
| EP | 0269470 | 1/1988 |
| EP | 0586211 | 3/1994 |
| EP | 0586212 | 3/1994 |
| EP | 0586213 | 3/1994 |
| EP | 0747419 | 12/1996 |
| FR | 2270311 | 2/1974 |
| FR | 2365017 | 4/1978 |
| FR | 2445885 | 8/1980 |
| FR | 2564374 | 11/1985 |
| GB | 1443194 | 7/1976 |
| GB | 2036148 | 6/1980 |
| GB | 2104903 | 3/1983 |
| GB | 2171953 | 9/1986 |
| GB | 2186655 | 8/1987 |
| WO | WO 90/08020 | 7/1990 |

OTHER PUBLICATIONS

Bendtsen et al., Mechanical Properties of Wood, pp. 4–2 to 4–44.
Bibliography of Solid Phase Extrusion, pp. 187–195.
Brzoskowski et al., Air–Lubricated Die for Extrusion of Rubber Compounds, Rubber Chemistry and Technology, vol. 60, p. 945–956.

(List continued on next page.)

Primary Examiner—Henry Bennett
Assistant Examiner—Malik N. Drake
(74) Attorney, Agent, or Firm—Standley & Gilcrest LLP

(57) ABSTRACT

The present invention relates to a system and a method for cooling extruded and molded materials. The present invention is especially useful to thoroughly cool an extrudate by releasing a cooling fluid in a hollow portion of the extrudate. Hollows may be created in order to reduce material, weight, and/or processing time. A fluid below about 80 degrees Fahrenheit is released into the hollow so as to cool the material and to assist in solidification. Increases in production line throughput may result by rapidly cooling the molded material. Other uses for the present invention include injection molding, compression molding, gas assist molding, and co-extrusion.

16 Claims, 9 Drawing Sheets

U.S. PATENT DOCUMENTS

| | | | |
|---|---|---|---|
| 2,558,378 A | 6/1951 | Petry ............................ 260/41 |
| 2,635,976 A | 4/1953 | Meiler et al. ................ 154/132 |
| 2,680,102 A | 6/1954 | Becher ........................ 260/17.3 |
| 2,789,903 A | 4/1957 | Lukman et al. ................. 92/21 |
| 2,935,763 A | 5/1960 | Newman et al. ................ 18/55 |
| 3,287,480 A | 11/1966 | Wechsler et al. ............ 264/122 |
| 3,308,218 A | 3/1967 | Wiegand et al. ............. 264/121 |
| 3,308,507 A | 3/1967 | Black ............................. 18/12 |
| 3,309,444 A | 3/1967 | Schueler ....................... 264/109 |
| 3,492,388 A | 1/1970 | Inglin-Knüsel ............. 264/129 |
| 3,493,527 A | 2/1970 | Schueler ....................... 260/17.2 |
| 3,562,373 A | 2/1971 | Logrippo ..................... 264/118 |
| 3,645,939 A | 2/1972 | Gaylord ............... 260/17.4 GC |
| 3,671,615 A | 6/1972 | Price ............................. 264/39 |
| 3,864,201 A | 2/1975 | Susuki et al. ................ 161/160 |
| 3,867,493 A | 2/1975 | Seki ........................... 264/45.9 |
| 3,878,143 A | 4/1975 | Baumann et al. ....... 260/17.4 R |
| 3,879,505 A | 4/1975 | Boutillier et al. ............. 264/48 |
| 3,888,810 A | 6/1975 | Shinomura ........... 260/17.4 BB |
| 3,899,559 A | 8/1975 | Johnanason et al. ........ 264/115 |
| 3,922,328 A | 11/1975 | Johnson ..................... 264/46.1 |
| 3,931,384 A | 1/1976 | Forquer et al. ............. 264/120 |
| 3,943,079 A | 3/1976 | Hamed ................ 260/17.4 BB |
| 3,954,555 A | 5/1976 | Kole et al. ................... 162/136 |
| 3,956,541 A | 5/1976 | Pringle ........................... 428/2 |
| 3,956,555 A | 5/1976 | McKean ...................... 428/106 |
| 3,969,459 A | 7/1976 | Fremont et al. ............. 264/109 |
| 4,005,162 A | 1/1977 | Bucking ........................ 264/25 |
| 4,012,348 A | 3/1977 | Chelland et al. ........ 260/28.5 R |
| 4,016,232 A | 4/1977 | Pringle ........................ 264/112 |
| 4,016,233 A | 4/1977 | Pringle ........................ 264/122 |
| 4,018,722 A | 4/1977 | Baker .......................... 260/2.3 |
| 4,029,831 A | 6/1977 | Daunheimer ................ 427/264 |
| 4,045,603 A | 8/1977 | Smith ............................. 428/2 |
| 4,054,632 A | 10/1977 | Franke ......................... 264/145 |
| 4,056,591 A | 11/1977 | Goettler et al. ............. 264/108 |
| 4,058,580 A | 11/1977 | Flanders ..................... 264/113 |
| 4,071,479 A | 1/1978 | Broyde et al. ................ 260/2.3 |
| 4,071,494 A | 1/1978 | Gaylord .................. 260/42.14 |
| 4,097,648 A | 6/1978 | Pringle ....................... 428/326 |
| 4,102,106 A | 7/1978 | Golder et al. ................ 52/533 |
| 4,107,110 A | 8/1978 | Lachowicz et al. .. 260/17.4 CL |
| 4,115,497 A | 9/1978 | Halmo et al. ................ 264/115 |
| 4,145,389 A | 3/1979 | Smith ....................... 264/40.7 |
| 4,157,415 A | 6/1979 | Lindenberg ................ 428/284 |
| 4,168,251 A | 9/1979 | Schinzel et al. ........ 260/17.4 R |
| 4,178,411 A | 12/1979 | Cole et al. ................... 428/310 |
| 4,181,764 A | 1/1980 | Totten ........................ 428/155 |
| 4,187,352 A | 2/1980 | Klobbie ....................... 521/79 |
| 4,191,798 A | 3/1980 | Schumacher et al. ......... 428/95 |
| 4,192,839 A | 3/1980 | Hayashi et al. ............ 264/45.5 |
| 4,203,876 A | 5/1980 | Dereppe et al. ....... 260/17.4 R |
| 4,221,621 A | 9/1980 | Seki et al. ..................... 156/78 |
| 4,228,116 A | 10/1980 | Colombo et al. ........... 264/119 |
| 4,239,679 A | 12/1980 | Rolls et al. .............. 260/42.49 |
| 4,241,133 A | 12/1980 | Lund et al. .................. 428/326 |
| 4,244,903 A | 1/1981 | Schnause ..................... 264/68 |
| 4,248,743 A | 2/1981 | Goettler ............... 260/17.4 BB |
| 4,248,820 A | 2/1981 | Haataja ....................... 264/113 |
| 4,250,222 A | 2/1981 | Mavel et al. ................ 428/285 |
| 4,263,184 A | 4/1981 | Leo et al. ............ 260/17.4 CL |
| 4,263,196 A | 4/1981 | Schumacher et al. ...... 260/33.6 |
| 4,272,577 A | 6/1981 | Lyng ......................... 428/112 |
| 4,273,688 A | 6/1981 | Porzel et al. .......... 260/17.4 R |
| 4,277,428 A | 7/1981 | Luck et al. .................. 264/118 |
| 4,290,988 A | 9/1981 | Nopper et al. .............. 264/112 |
| 4,303,019 A | 12/1981 | Haataja et al. ............. 108/51.1 |
| 4,305,901 A | 12/1981 | Prince et al. ........... 264/176 R |
| 4,317,765 A | 3/1982 | Gaylord ..................... 523/204 |
| 4,323,625 A | 4/1982 | Coran et al. ................ 428/361 |
| 4,376,144 A | 3/1983 | Goettler ....................... 428/36 |
| 4,382,108 A | 5/1983 | Carroll et al. ............. 428/326 |
| 4,382,758 A | 5/1983 | Nopper et al. ............. 425/82.1 |
| 4,393,020 A | 7/1983 | Li et al. ...................... 264/108 |
| 4,414,267 A | 11/1983 | Coran et al. ................ 428/288 |
| 4,420,351 A | 12/1983 | Lussi et al. ................ 156/62.4 |
| 4,430,468 A | 2/1984 | Schumacher ................ 524/109 |
| 4,440,708 A | 4/1984 | Haataja et al. .............. 264/109 |
| 4,480,061 A | 10/1984 | Coughlin et al. ............. 524/13 |
| 4,481,701 A | 11/1984 | Hewitt ........................ 29/416 |
| 4,491,553 A | 1/1985 | Yamada et al. ............... 264/51 |
| 4,503,115 A | 3/1985 | Hemels et al. .............. 428/281 |
| 4,505,869 A | 3/1985 | Nishibori .................... 264/115 |
| 4,506,037 A | 3/1985 | Suzuki et al. ................. 521/82 |
| 4,508,595 A | 4/1985 | Gasland ...................... 162/158 |
| 4,562,218 A | 12/1985 | Fornadel et al. .............. 524/15 |
| 4,573,893 A * | 3/1986 | Waters et al. ................. 425/71 |
| 4,594,372 A | 6/1986 | Natov et al. ................ 523/208 |
| 4,597,928 A | 7/1986 | Terentiev et al. ............. 264/87 |
| 4,610,900 A | 9/1986 | Nishibori ...................... 428/15 |
| 4,645,631 A | 2/1987 | Hegenstaller et al. ......... 264/69 |
| 4,659,754 A | 4/1987 | Edwards et al. ............ 523/214 |
| 4,663,107 A * | 5/1987 | Takada et al. ............... 264/519 |
| 4,663,225 A | 5/1987 | Farley et al. ............... 428/290 |
| 4,687,793 A | 8/1987 | Motegi et al. .............. 523/200 |
| 4,717,742 A | 1/1988 | Beshay ....................... 523/203 |
| 4,734,236 A | 3/1988 | Davis ......................... 264/112 |
| 4,737,532 A | 4/1988 | Fujita et al. ................. 524/13 |
| 4,746,688 A | 5/1988 | Bistak et al. ................ 523/220 |
| 4,769,109 A | 9/1988 | Tellvik et al. ............... 162/123 |
| 4,769,274 A | 9/1988 | Tellvik et al. .............. 428/218 |
| 4,783,493 A | 11/1988 | Motegi et al. ............... 524/13 |
| 4,789,604 A | 12/1988 | van der Hoeven .......... 428/503 |
| 4,790,966 A | 12/1988 | Sandberg et al. ............. 264/39 |
| 4,791,020 A | 12/1988 | Kokta ........................ 428/326 |
| 4,801,495 A | 1/1989 | van der Hoeven .......... 428/286 |
| 4,818,604 A | 4/1989 | Tock ......................... 428/319.9 |
| 4,820,749 A | 4/1989 | Beshay ....................... 523/203 |
| 4,851,458 A | 7/1989 | Hopperdietzel ............. 523/205 |
| 4,865,788 A | 9/1989 | Davis ......................... 264/112 |
| 4,889,673 A | 12/1989 | Takimoto .................... 264/118 |
| 4,894,192 A | 1/1990 | Warych ........................ 264/68 |
| 4,915,764 A | 4/1990 | Miani .................... 156/244.19 |
| 4,927,572 A | 5/1990 | van der Hoeven ............ 264/22 |
| 4,927,579 A | 5/1990 | Moore ........................ 264/101 |
| 4,935,182 A | 6/1990 | Ehner et al. ................ 264/112 |
| 4,960,548 A | 10/1990 | Ikeda et al. ................ 264/40.4 |
| 4,968,463 A | 11/1990 | Levasseur .................. 264/40.1 |
| 4,973,440 A | 11/1990 | Tamura et al. .............. 264/114 |
| 4,978,489 A | 12/1990 | Radvan et al. .............. 264/118 |
| 4,988,478 A | 1/1991 | Held ........................... 264/518 |
| 5,002,713 A | 3/1991 | Palardy et al. .............. 264/109 |
| 5,008,310 A | 4/1991 | Beshay ........................ 524/13 |
| 5,009,586 A | 4/1991 | Pallmann .................... 425/311 |
| 5,049,334 A | 9/1991 | Bach .......................... 264/122 |
| 5,057,167 A | 10/1991 | Gersbeck .................. 156/62.2 |
| 5,064,592 A | 11/1991 | Ueda et al. .................. 264/112 |
| 5,075,057 A | 12/1991 | Hoedl ......................... 264/115 |
| 5,075,359 A | 12/1991 | Castagna et al. ............. 524/13 |
| 5,078,937 A | 1/1992 | Eela ........................... 264/109 |
| 5,082,605 A | 1/1992 | Brooks et al. ............. 264/40.6 |
| 5,087,400 A | 2/1992 | Theuveny .................... 264/115 |
| 5,088,910 A | 2/1992 | Goforth et al. .............. 425/142 |
| 5,096,046 A | 3/1992 | Goforth et al. ............. 198/604 |
| 5,096,406 A | 3/1992 | Brooks et al. .............. 425/205 |
| 5,120,776 A | 6/1992 | Raj et al. ..................... 524/13 |
| 5,137,673 A | 8/1992 | Bourcier et al. ............ 264/151 |
| 5,153,241 A | 10/1992 | Beshay .......................... 524/8 |
| 5,194,461 A | 3/1993 | Bergquist et al. ............. 524/13 |
| 5,219,634 A | 6/1993 | Aufderhaar ................. 428/156 |
| 5,272,000 A | 12/1993 | Chenoweth et al. ........ 428/283 |

| | | | |
|---|---|---|---|
| 5,276,082 A | 1/1994 | Forry et al. | 524/504 |
| 5,288,772 A | 2/1994 | Hon | 524/35 |
| 5,302,634 A | 4/1994 | Mushovic | 523/219 |
| 5,369,147 A | 11/1994 | Mushovic | 523/219 |
| 5,393,536 A | 2/1995 | Brandt et al. | 425/112 |
| 5,406,768 A | 4/1995 | Giuseppe et al. | 52/730.4 |
| 5,422,170 A | 6/1995 | Iwata et al. | 428/218 |
| 5,435,954 A | 7/1995 | Wold | 264/115 |
| 5,441,801 A | 8/1995 | Deaner et al. | 428/326 |
| 5,458,834 A | 10/1995 | Faber et al. | 264/109 |
| 5,474,722 A | 12/1995 | Woodhams | 264/45.3 |
| 5,480,602 A | 1/1996 | Nagaich | 264/122 |
| 5,486,553 A | 1/1996 | Deaner et al. | 524/13 |
| 5,497,594 A | 3/1996 | Giuseppe et al. | 52/730.4 |
| 5,516,472 A | 5/1996 | Laver | 264/118 |
| 5,518,677 A | 5/1996 | Deaner et al. | 264/142 |
| 5,532,065 A | 7/1996 | Gubitz et al. | 428/480 |
| 5,537,789 A | 7/1996 | Minke et al. | 52/313 |
| 5,539,027 A | 7/1996 | Deaner et al. | 524/13 |
| 5,576,374 A | 11/1996 | Betso et al. | 524/451 |
| 5,585,155 A | 12/1996 | Heikkila et al. | 428/36 |
| 5,593,625 A | 1/1997 | Riebel et al. | 264/115 |
| 5,597,586 A | 1/1997 | Wilson et al. | 425/67 |
| 5,695,874 A | 12/1997 | Deaner et al. | 428/326 |
| 5,730,914 A * | 3/1998 | Ruppmann, Sr. | 264/28 |
| 5,773,138 A | 6/1998 | Seethamraju et al. | 428/326 |
| 5,783,125 A | 7/1998 | Bastone et al. | 264/45.3 |
| 5,827,462 A | 10/1998 | Brandt et al. | 264/179 |
| 5,827,607 A | 10/1998 | Deaner et al. | 428/326 |
| 5,836,128 A | 11/1998 | Groh et al. | 52/580 |
| 5,866,264 A | 2/1999 | Zehner et al. | 428/481 |
| 5,882,564 A | 3/1999 | Puppin | 264/177.16 |
| 5,932,334 A | 8/1999 | Deaner et al. | 428/292.4 |
| 5,948,505 A | 9/1999 | Puppin | 428/121 |
| 5,948,524 A | 9/1999 | Seethamraju et al. | 428/326 |
| 5,981,067 A | 11/1999 | Seethamraju et al. | 428/393 |
| 5,985,429 A | 11/1999 | Plummer et al. | 428/220 |
| 6,004,668 A | 12/1999 | Deaner et al. | 428/326 |
| 6,007,656 A | 12/1999 | Heikkila et al. | 156/180 |
| 6,011,091 A | 1/2000 | Zehner | 524/13 |
| 6,015,611 A | 1/2000 | Deaner et al. | 428/326 |
| 6,015,612 A | 1/2000 | Deaner et al. | 428/326 |
| 6,035,588 A | 3/2000 | Zehner et al. | 52/98 |
| 6,054,207 A | 4/2000 | Finley | 428/317.9 |
| 6,103,791 A | 8/2000 | Zehner | 524/13 |
| 6,106,944 A | 8/2000 | Heikkila et al. | 428/397 |
| 6,117,924 A | 9/2000 | Brandt | 524/13 |
| 6,122,877 A | 9/2000 | Hendrickson et al. | 52/520 |
| 6,131,355 A | 10/2000 | Groh et al. | 52/592.1 |
| 6,153,293 A | 11/2000 | Dahl et al. | 428/310.5 |
| 6,180,257 B1 | 1/2001 | Brandt et al. | 428/532 |
| 6,210,616 B1 | 4/2001 | Suwanda | 264/151 |
| 6,210,792 B1 | 4/2001 | Seethamraju et al. | 428/326 |
| 6,248,813 B1 | 6/2001 | Zehner | 524/13 |
| 6,265,037 B1 | 7/2001 | Godavarti et al. | 428/34 |
| 6,272,808 B1 | 8/2001 | Groh et al. | 52/592.1 |
| 6,280,667 B1 | 8/2001 | Koenig et al. | 264/68 |
| 6,284,098 B1 | 9/2001 | Jacobsen | 162/150 |
| 6,295,778 B1 | 10/2001 | Burt | 52/592.6 |
| 6,323,279 B1 * | 11/2001 | Gunthergerg et al. | 525/70 |
| 6,337,138 B1 | 1/2002 | Zehner et al. | 428/511 |
| 6,341,458 B1 | 1/2002 | Burt | 52/287.1 |
| 6,342,172 B1 | 1/2002 | Finley | 264/45.3 |
| 6,344,504 B1 | 2/2002 | Zehner et al. | 524/14 |
| 6,346,160 B1 | 2/2002 | Puppin | 156/88 |
| 6,357,197 B1 | 3/2002 | Serino et al. | 52/738.1 |
| 6,358,585 B1 | 3/2002 | Wolff | 428/36.6 |
| 6,360,508 B1 | 3/2002 | Pelfrey et al. | 52/520 |
| 6,409,952 B1 | 6/2002 | Hacker et al. | 264/171.1 |
| 6,423,257 B1 | 7/2002 | Stobart et al. | 264/145 |
| 6,453,630 B1 | 9/2002 | Buhrts et al. | 52/177 |
| 6,464,913 B1 | 10/2002 | Korney, Jr. | 264/102 |
| 6,511,757 B1 | 1/2003 | Brandt et al. | 428/532 |
| 2001/0019749 A1 | 9/2001 | Godavarti et al. | 428/34.2 |
| 2001/0051242 A1 | 12/2001 | Godavarti et al. | 428/36.9 |
| 2001/0051243 A1 | 12/2001 | Godavarti et al. | 428/36.9 |
| 2002/0015820 A1 | 2/2002 | Puppin | 428/121 |
| 2002/0038684 A1 | 4/2002 | Puppin | 156/88 |
| 2002/0040557 A1 | 4/2002 | Felton | 52/309.13 |
| 2002/0192401 A1 | 12/2002 | Matsumoto et al. | 428/15 |
| 2002/0192431 A1 | 12/2002 | Edgeman | 428/181 |

OTHER PUBLICATIONS

Collier et al., High Strength Extrudates by Melt Transformation Coextrusion, ANTEC 1987, pp. 497–502.

Collier et al., Streamlined Dies and Profile Extrusion, ANTEC, 1987, pp. 203–206.

Company News, Plastics Industry News, May 1994, pp. 70–71.

Dalväg et al., The Efficiency of Cellulosic Fillers in Common Thermoplastics. Part II. Filling with Processing Aids and Coupling Agents, 1985, vol. 11, pp. 9–38.

Fiberloc POlymer Composites, B.F. Goodrich, Geon Vinyl Division, section 1, pp. 2–15.

Fill Thermoplastics with Wood, Modern Plastics, May 1974, pp. 54–55.

Fillers for Thermoplastics: Beyond Resin Stretching, Modern Plastics International, Oct. 1976, pp. 12–15.

From Sweden: Extruded Interior Trim Made of PVC and Wood Flour, Plastic Building Contruction, vol. 9 No. 5, 1986, pp. 5–6.

Henrici–Olive et al., Integral/Structural Ploymer Foams, Technology, Properties and Applications, Springer–Verlag, pp. 111–122.

Klason et al., The Efficiency of Cellulosic Fillers in Common Thermoplastics. Part 1 Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride—Wood Fibers. I. Effect of Isocyanate as a Bonding Agent, Polym.—Plast. Technol. Eng., 1990, 29(1&2), pp. 87–118.

Kokta et al., Composites of Polyvinyl Chloride—Wood Fibers. III: Effect of Silane as Coupling Agent, Journal of Vinyl Technology, Sep. 1990, pp. 146–153.

Kokta et al., Use of Grafted Wood Fibers in Thermoplastic Composites v. Polystyrene, Centre de recherche en pâtes et papiers, Université de Québec à Trois–Rivières, Canada.

Kokta et al., Use of Wood Fibers in Thermoplastic Composites, Polymer Composites, Oct. 1983, pp. 229–232.

Maldas et al., Composites of Polyvinyl Chloride—Wood Fibers: IV. Effect of the Nature of Fibers, Journal of Vinyl Technology, Jun. 1989, pp. 90–98.

Maldas, et al.. Improving Adhesion of Wood Fiber with Polystrene by the Chemical Treatment of Fiber with a Coupling Agent and the Influence on the Mechanical Properties of Composites, Journal of Adhesion Science Technology, vol. 3 no. 7, pp. 529–539 (1989).

Myers et al., "Wood flour and polypropylene or high–density polyethylene composites: influence of maleated polypropylene concentration and extrusion temperature on properties", "Wood Fiber/Polymer Composites: Fundamental Concepts, Processes, and Material Options", pp. 49–56.

Myers et al., Bibliography: Composites from Plastics and Wood–Based Fillers, USDA Forest Products Laboratory, Madison, WI, pp. 1–27 odds (1991).

Myers et al., Effects of Composition and Polypropylene Melt Flow on Polypropylene—Waste Newspaper Composites, ANTEC, 1984, pp. 602–604.

Pornnimit et al., Extrusion of Self–Reinforced Polyethylene, Advances in Polymer Technology, vol. 11, No. 2, pp. 92–98.

Raj et al., Use of Wood Fiber as Filler in Common Thermoplastics: Studies on Mechanical Properties, Science and Engineering of Composite Materials, vol. 1 No. 3, 1989, pp. 85–98.

Raj et al., Use of Wood Fibers in Thermoplastics. VII. The Effect of Coupling Agents in Polyethylene—Wood Fiber Composites, Journal of Applied Polymer Science, vol. 37, pp. 1089–1103 (1989).

Resin Stretching: Accent on Performance, Modern Plastic International, Jan. 1974, pp. 58–60.

Rogalski et al., Poly(Vinyl–Chloride) Wood Fiber Composites, ANTEC, 1987, pp. 1436–1441.

Sonwood Outline, Apr., 1975.

Sonwood: a new PVC wood–flour alloy for Extrusions and other Plastic Processing Techniques, Sonesson Plast AB, Malmo, Sweden.

Thomas et al., Wood Fibers for Reinforcing Fillers for Polyolefins, ANTEC, 1984, pp. 687–689.

Wood Filled PVC, Plastics Industry News, Jul. 1996, p. 6.

Woodhams et al., Wood Fibers for Reinforcing Fillers for Polyolefins, Polymer Engineering and Science, Oct. 1984, pp. 1166–1171.

Yam et al., Composites from Compounding Wood Fibers With Recycled High Density Polyethylene, Polymer Engineering and Science, mid–June 1990, pp. 693–699, vol. 30, No. 11.

Yuskova, et al., Interaction of Components in Poly(Vinyl Choloride) Filled in Polymetization, Makroniol Chem., Macromol. Symp. 29, 315–320 (1989).

Zadorecki et al., Future Prospects for Wood Cellulose as Reinforcement In Organic Polymer Composites, Polymer Composites, Apr. 1989, pp. 69–77.

* cited by examiner

COOLING OF EXTRUDED AND COMPRESSION MOLDED MATERIALS

This is a continuation-in-part of U.S. application Ser. No. 09/766,054, filed Jan. 19, 2001, which is hereby incorporated by reference in its entirety.

BACKGROUND AND SUMMARY OF THE INVENTION

The present invention relates generally to a system and method for cooling manufactured articles and, more particularly, to a system and method for cooling extruded and molded materials with a fluid that is below about 80 degrees Fahrenheit. The present invention may also be used in other types of manufacturing techniques in which the output or material must be cooled from a heated state. The present invention includes a system and method for cooling synthetic wood composite materials including, but not limited to, cellulosic-filled plastic composites. In addition, the present invention may also be used to cool other types of pure or mixed materials including, but not limited to, plastics, polymers, foamed plastics, plastic compositions, inorganic-filled plastic compositions, metals, metallic compositions, alloys, mixtures including any of the aforementioned materials, and other similar, conventional, or suitable materials that need to be cooled after being processed. For instance, the present invention may be used to cool polyvinyl chloride (PVC) products and products made from other plastics.

For several reasons, there is a need to find materials that exhibit the look and feel of natural wood. The supply of wood in the world's forests for construction and other purposes is dwindling. Consequently, the supply of wood from mature trees has become a concern in recent years, and the cost of wood has risen. As a result, several attempts have been made by others to find a suitable wood-like material.

Cellulosic/polymer composites have been developed as replacements for all-natural wood, particle board, wafer board, and other similar materials. For example, U.S. Pat. Nos. 3,908,902, 4,091,153, 4,686,251, 4,708,623, 5,002,713, 5,055,247, 5,087,400, 5,151,238, 6,011,091, and 6,103,791 relate to processes and/or compositions for making wood replacement products. As compared to natural woods, cellulosic/polymer composites offer superior resistance to wear and tear. In addition, cellulosic/polymer composites have enhanced resistance to moisture, and it is well known that the retention of moisture is a primary cause of the warping, splintering, and discoloration of natural woods. Moreover, cellulosic/polymer composites may be sawed, sanded, shaped, turned, fastened, and finished in the same manner as natural woods. Therefore, cellulosic/polymer composites are commonly used for applications such as interior and exterior decorative house moldings, picture frames, furniture, porch decks, deck railings, window moldings, window components, door components, roofing structures, building siding, and other suitable indoor and outdoor items. However, many attempts to make products from cellulosic/polymer composite materials have failed due to poor or improper manufacturing techniques.

In the present invention, a product or article is manufactured by a desired technique such as, but not limited to, extrusion, compression molding, injection molding, or other similar, suitable, or conventional manufacturing techniques. The product is then cooled by subjecting it to a fluid that is below about 80 degrees Fahrenheit. The present invention can be used alone or in conjunction with other known or later developed cooling methods. Accordingly, the present invention can more thoroughly and efficiently cool the manufactured product or article to a desired level. This can lead to faster production times as well as a product having improved structural, physical, and aesthetic characteristics.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

The present invention is directed to a system and method for cooling manufactured articles or products. It is not intended to limit the present invention to particular manufacturing techniques or particular materials. The present invention may be used to cool articles or products made by variety of different manufacturing techniques. Examples of manufacturing techniques that may utilize the present invention include, but are not limited to, extrusion (including co-extrusion), compression molding, injection molding, and other known, similar, or conventional techniques for manufacturing products or articles from plastic, wood, metal, mixtures of these materials, or other materials used to make products.

The present invention is particularly useful for cooling plastics, polymers, and cellulosic/polymer composite materials that have been extruded or molded. The materials that may be used to make cellulosic/polymer composites include, but are not limited to, cellulosic fillers, polymers, plastics, thermoplastics, inorganic fillers, cross-linking agents, lubricants, process aids, stabilizers, accelerators, inhibitors, enhancers, compatibilizers, blowing agents, foaming agents, thermosetting materials, and other similar, suitable, or conventional materials. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, flax, and other similar materials. In addition to PVC, examples of polymers include multilayer films, high density polyethylene (HDPE), polypropylene (PP), low density polyethylene (LDPE), chlorinated polyvinyl chloride (CPVC), acrylonitrile butadiene styrene (ABS), ethyl-vinyl acetate, other similar copolymers, other similar, suitable, or conventional thermoplastic materials, and formulations that incorporate any of the aforementioned polymers. Examples of inorganic fillers include talc, calcium carbonate, kaolin clay, magnesium oxide, titanium dioxide, silica, mica, barium sulfate, acrylics, and other similar, suitable, or conventional materials. Examples of thermosetting materials include polyurethanes, such as isocyanates, phenolic resins, unsaturated polyesters, epoxy resins, and other similar, suitable, or conventional materials. Combinations of the aforementioned materials are also examples of thermosetting materials. Examples of lubricants include zinc stearate, calcium stearate, esters, amide wax, paraffin wax, ethylene bis-stearamide, and other similar, suitable, or conventional materials. Examples of stabilizers include tin stabilizers, lead and metal soaps such as barium, cadmium, and zinc, and other similar, suitable, or conventional materials. In addition, examples of process aids include acrylic modifiers and other similar, suitable, or conventional materials.

Figure 1:
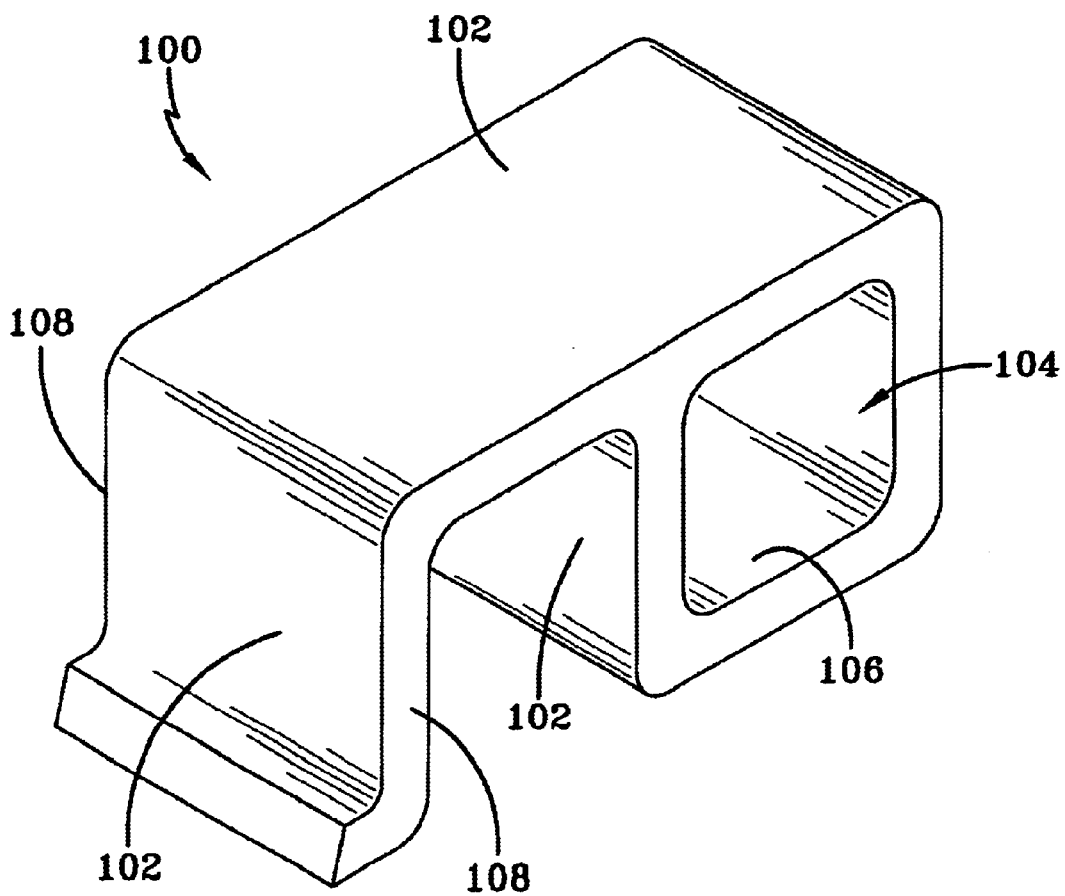
FIG. 1 is a cross sectional view of an extrudate.

FIG. 1 shows one example of an extrudate 100 that may be cooled by the present invention. The extrudate 100 includes an exterior surface 102, a hollow 104, an interior surface 106, and two ends 108. The exterior surface 102 may be cooled by a traditional method such as using a warm water bath or water mist. However, the interior surface 106 may not be sufficiently cooled by many traditional methods because the surface may not be available for contact with the cooling medium. The interior surface 106 defines the boundary of the hollow 104. The interior surface 106 may be accessed from either end 108. The interior surface 106 may not be cooled to a desired level within a desired amount of time by externally applied coolants.

Figure 2:
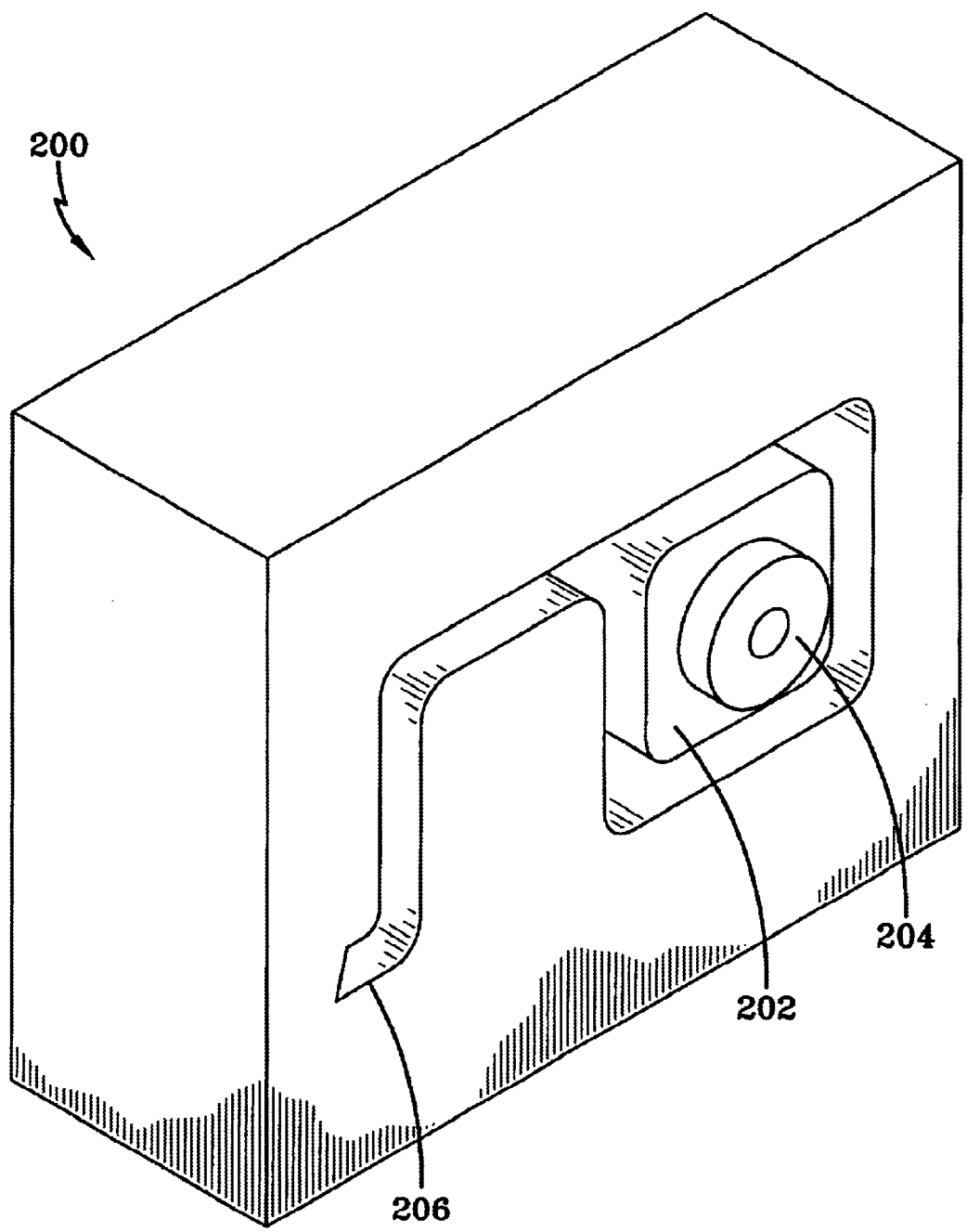
FIG. 2 is a view of an extrusion die showing an exemplary location of a cryogenic nozzle.

FIG. 2 shows one example of an extrusion die 200 adapted with the present invention. The extrusion die 200 defines the cross section of the extrudate by the shape of the profile form/flow channel 206. Hollows in the cross section of the extrudate are each formed with a standing core 202. The standing core 202 is fitted with a nozzle 204. The nozzle 204 is adapted to connect with a source of the cooling fluid (not shown). The nozzle 204 is oriented to spray into the hollow formed in the extrudate cross section by the standing core 202.

Figure 3:
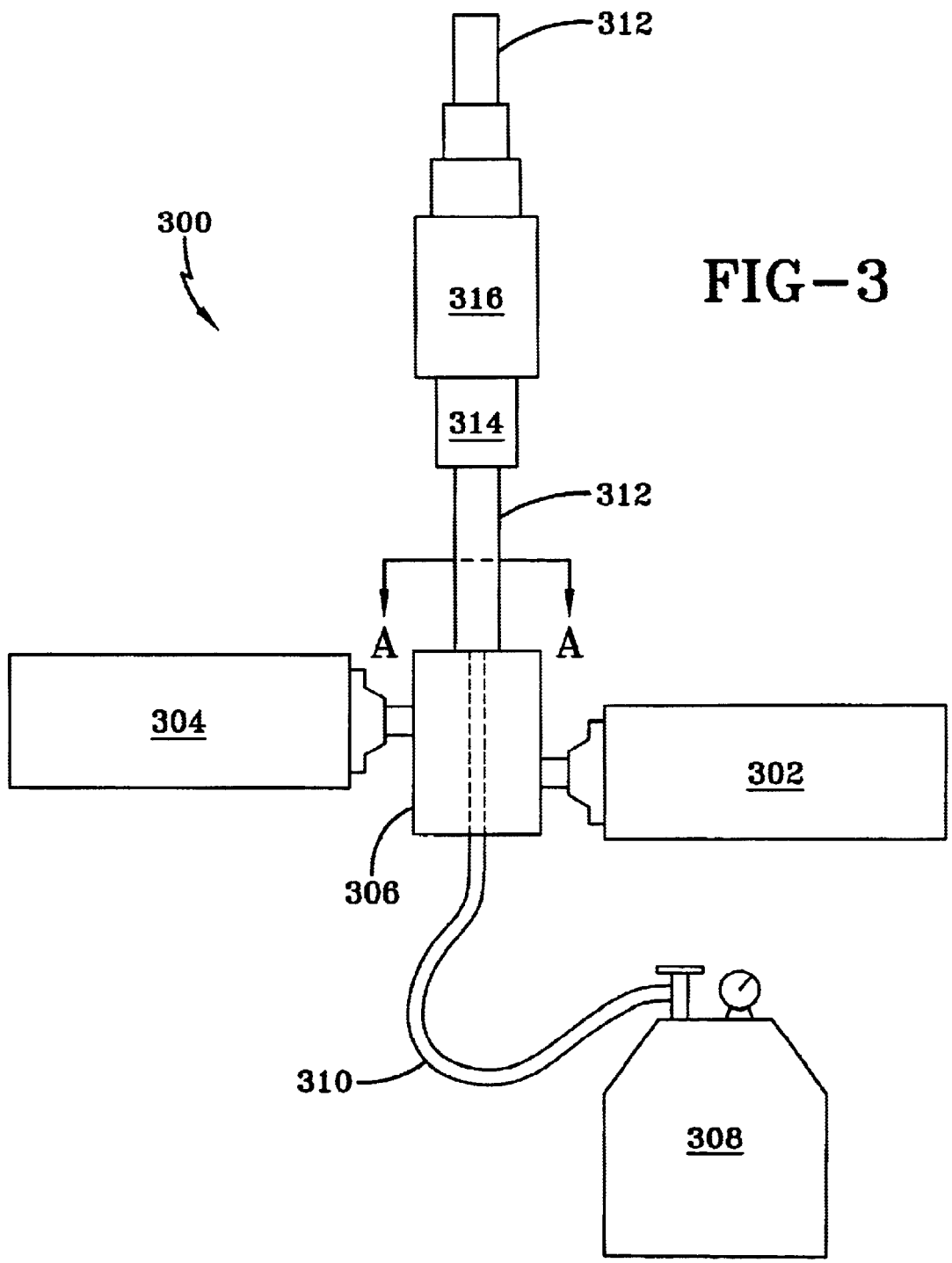
FIG. 3 is an elevation view of one embodiment of a system implementing the present invention.

FIG. 3 shows one example of a system 300 that may utilize the present invention. The system 300 includes an extruder 302 and an extruder 304. In this example, a crosshead die system 306 puts a cap layer from the extruder 304 on the material extruded by the extruder 302. A container 308 may be used to hold a cooling fluid of the present invention. The fluid is used to cool the extruded product or article 312 after it exits the die system 306. In this embodiment, a valve is used to control the release of gas, e.g., vapor, from the fluid. A hose, conduit, tube, or any other suitable transfer device 310 may be used to direct the gas from the container 308 to the desired location for cooling the extruded product 312. The transfer device 310 may be formed by one integral component or a plurality of interconnected components. For instance, a portion of the transfer device 310 may be a passage through the die system 306. In this example, the transfer device 310 extends through the die system 306 so that the gas is released in the hollow of the extruded product 312 after it exits the die system 306. In this manner, the present invention can provide efficient and thorough cooling of the extruded product 312. Moreover, the extruded product 312 may be further introduced into a liquid bath 314, a spray mist chamber 316, and/or any other desired cooling system to achieve additional cooling of the extruded product 312 if desired. Examples of the liquid bath 314 and the spray mist chamber 316 are provided in U.S. Pat. No. 5,827,462.

Depending on the type of cooling fluid and the desired expulsion rate of the cooling fluid, the container 308 may be pressurized. The container 308 may be connected to a compressor, e.g., an air compressor or any other similar, suitable, or conventional compressing device, in order to maintain the desired pressure in the container 308. Additionally, the container 308 may be in fluid communication with a blower or a pump to obtain the desired expulsion rate of the cooling fluid from the container 308. A blower in fluid communication with the container 308 may also be utilized to accelerate the cooling fluid to a desired velocity after it has been expelled.

Figure 4:
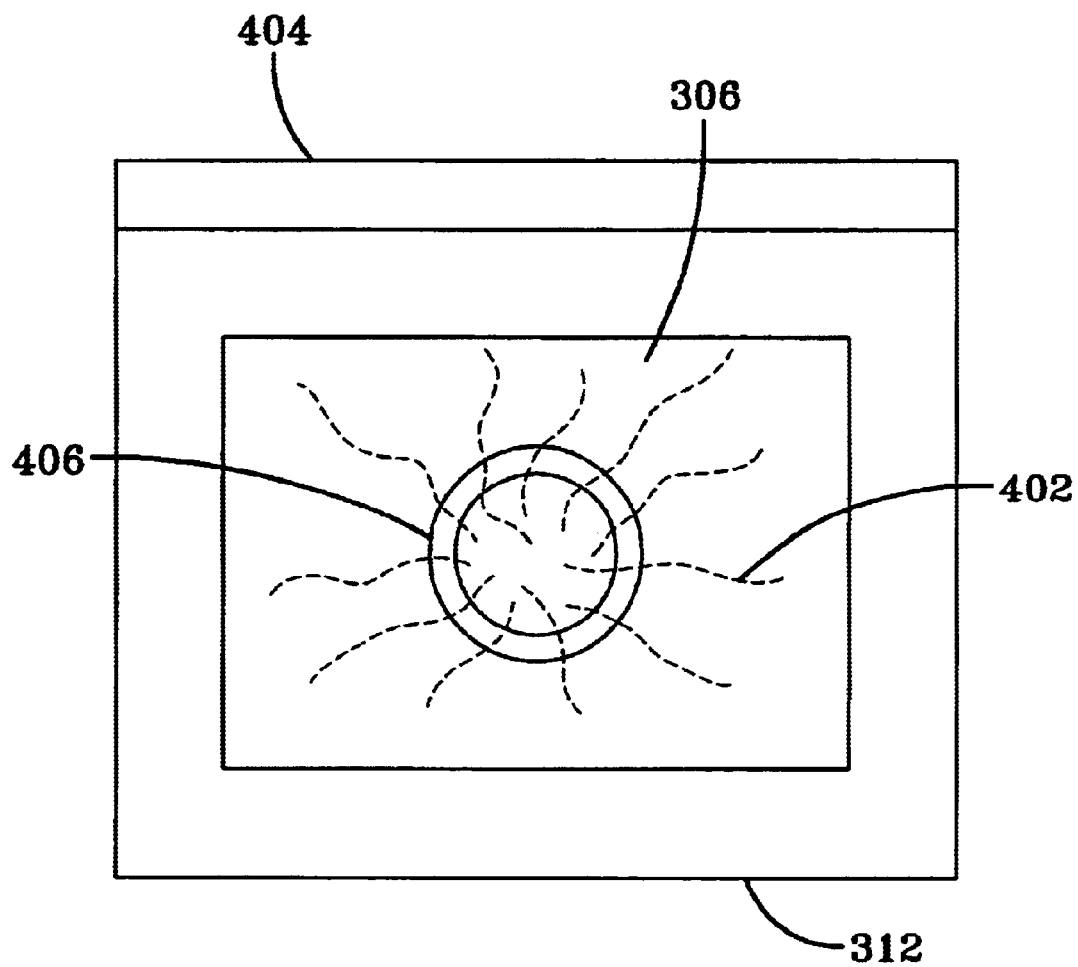
FIG. 4 is a partial cross sectional view along the line A—A of FIG. 3.

FIG. 4 is a cross section view along the line A—A of FIG. 3. The extruded product 312 includes a cap layer 404. The transfer device 310 may extend through the die system 306 to a nozzle 406 that releases gas from the cooling fluid into a hollow of the extruded product 312. In this instance, gas vapor 402 permeates through the hollow of the extruded product 312, thereby providing much improved cooling of the extruded product 312. In fact, the inventors have surprisingly discovered that using the present invention to inject the cooling fluid into a hollow portion of a product may be sufficient to thoroughly cool the entire product, i.e., the inside and the outside of the product. As a result, the present invention may eliminate the need to provide another cooling system to cool the outer surface of the product.

It should be recognized that FIGS. 3 and 4 are merely one example of a manufacturing system that may utilize the present invention. As noted above, the present invention may be used in any manufacturing system in which the processed material needs to be cooled to a desired level. For example, the present invention may be used in an extrusion system consisting of a single extruder that is in-line with a die system. Also, the present invention may be used to cool any type of material including, but not limited to, injection molded materials and compression molded materials.

Figure 5:
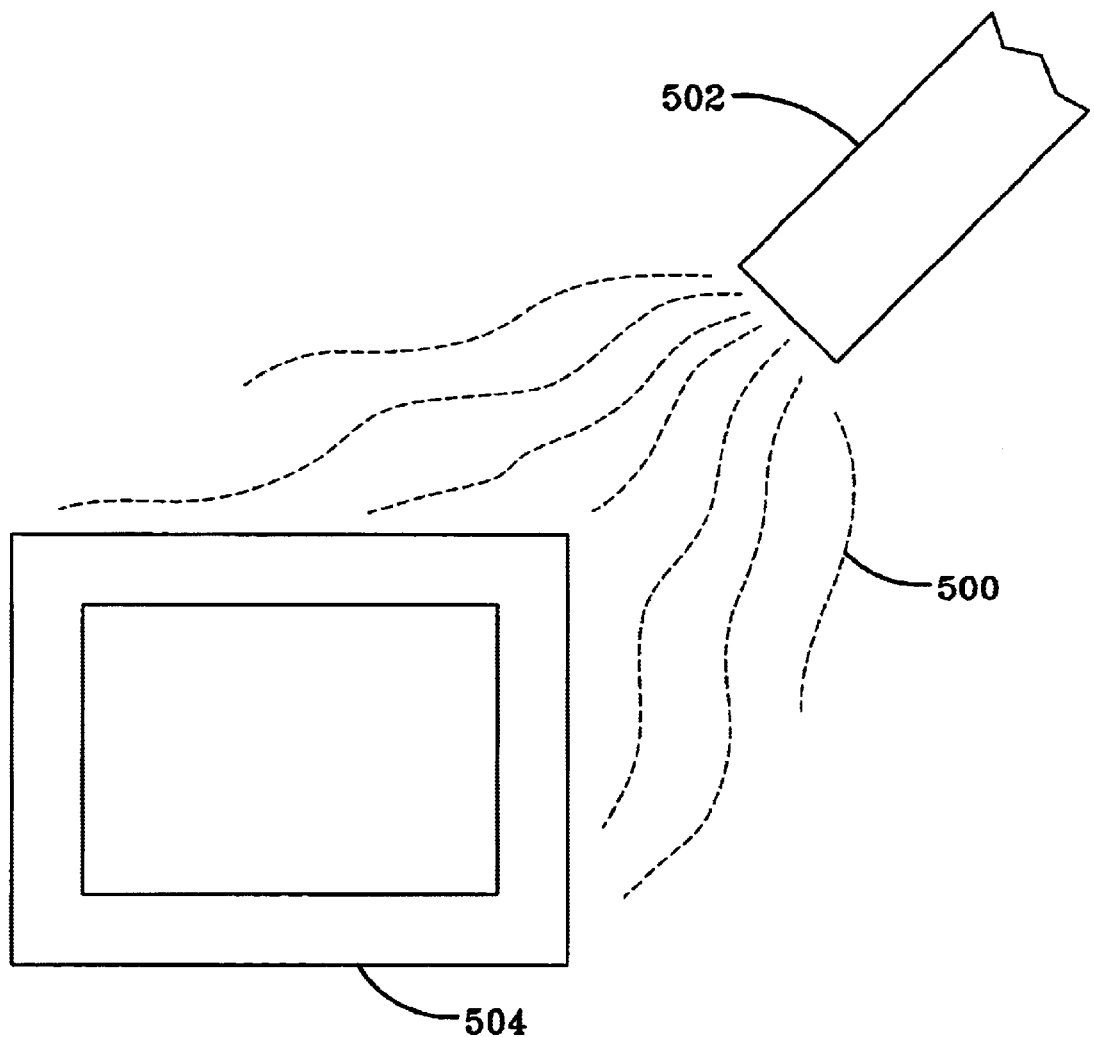
FIG. 5 is a partial elevation view of another embodiment of a system of the present invention.

It should also be recognized that the cooling fluid of the present invention may be expelled elsewhere relative to the manufactured product (i.e., other than in a hollow portion of the product). For example, FIG. 5 shows an embodiment in which the gas vapor 500 is dispersed by the transfer device 502 onto the exterior of the product 504. The present invention also includes dispersing multiple streams of the cooling fluid onto the same or different portions of the manufactured product. For instance, flows of the cooling fluid may be simultaneously dispersed onto the exterior and interior surfaces of the manufactured product.

Figure 6:
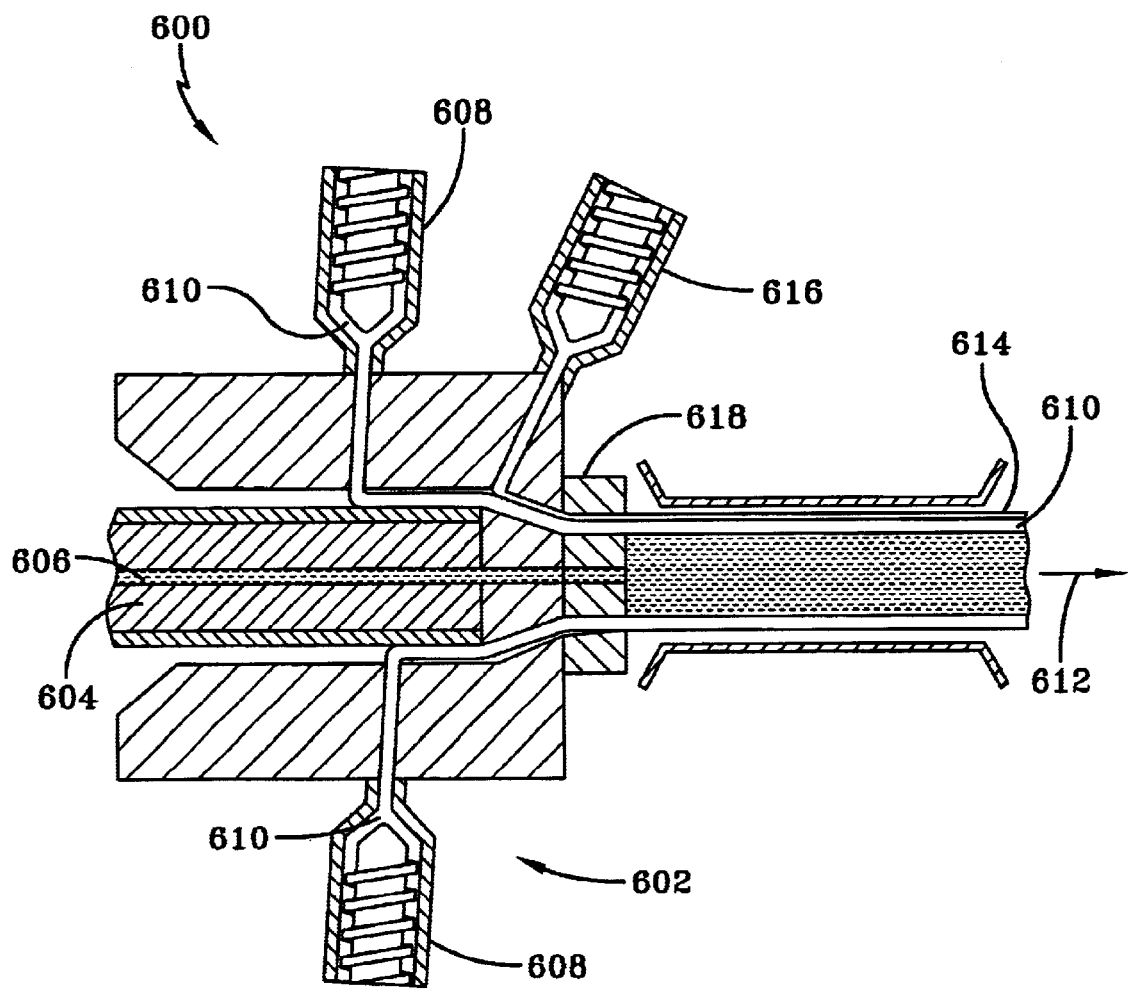
FIG. 6 shows a sectioned schematic of an extruder line used in accordance with the practice of one embodiment of the present invention.

Turning to FIG. 6, this Figure shows a sectioned schematic of an extruder line 600 used in accordance with the practice of one embodiment of the present invention. FIG. 6 shows an extruder line 600 which includes co-extrusion apparatus 602. Co-extrusion apparatus 602 includes insulated transport tube 604 that is adapted to carry cooling fluid 606. The cooling fluid 606 may be gas that may be delivered from a supply of cryogenic fluid. Co-extrusion apparatus 602 also includes a cross head extruder 608 which is adapted to prepare the thermoplastic material 610 for extrusion through a die which forms a hollow, rectangular profile and urges it along longitudinal direction 612. Further layers of thermoplastic material such as layer 614 may be added through the use of additional extruders such as extruder 616. Such additional layers of thermoplastic material may include layers of material with specific characteristics for exterior use, such as fluoropolymers and PVC having greater or lesser durability and resistance to changes in aesthetic appearance resulting from exposure to weather and environmental/atmospheric conditions, as dictated by the desired end user. The thermoplastic material 610 is formed by the forming die 618 into the desired final shape, such as a rectangular cross-section. The cooling fluid 606 permeates through the hollow space created in thermoplastic material 610. The cooling fluid 606 may be at a significantly lower temperature than the surrounding thermoplastic material 610. The cooling fluid 606 cools the thermoplastic material 610, assisting the thermoplastic material to "skin" or solidify.

Figure 7:
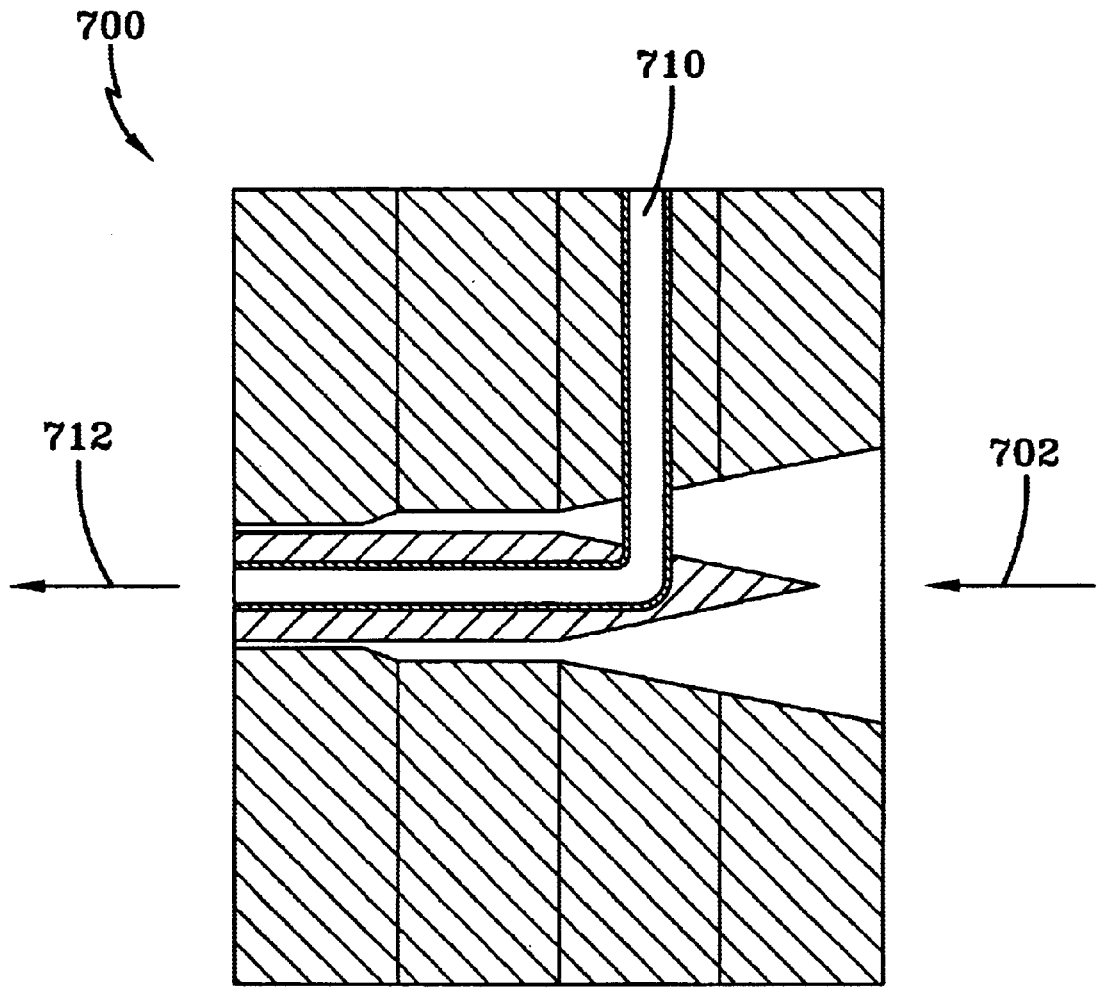
FIG. 7 is a cross sectional view from a lateral side angle of an exemplary die system of the present invention.
Figure 8:
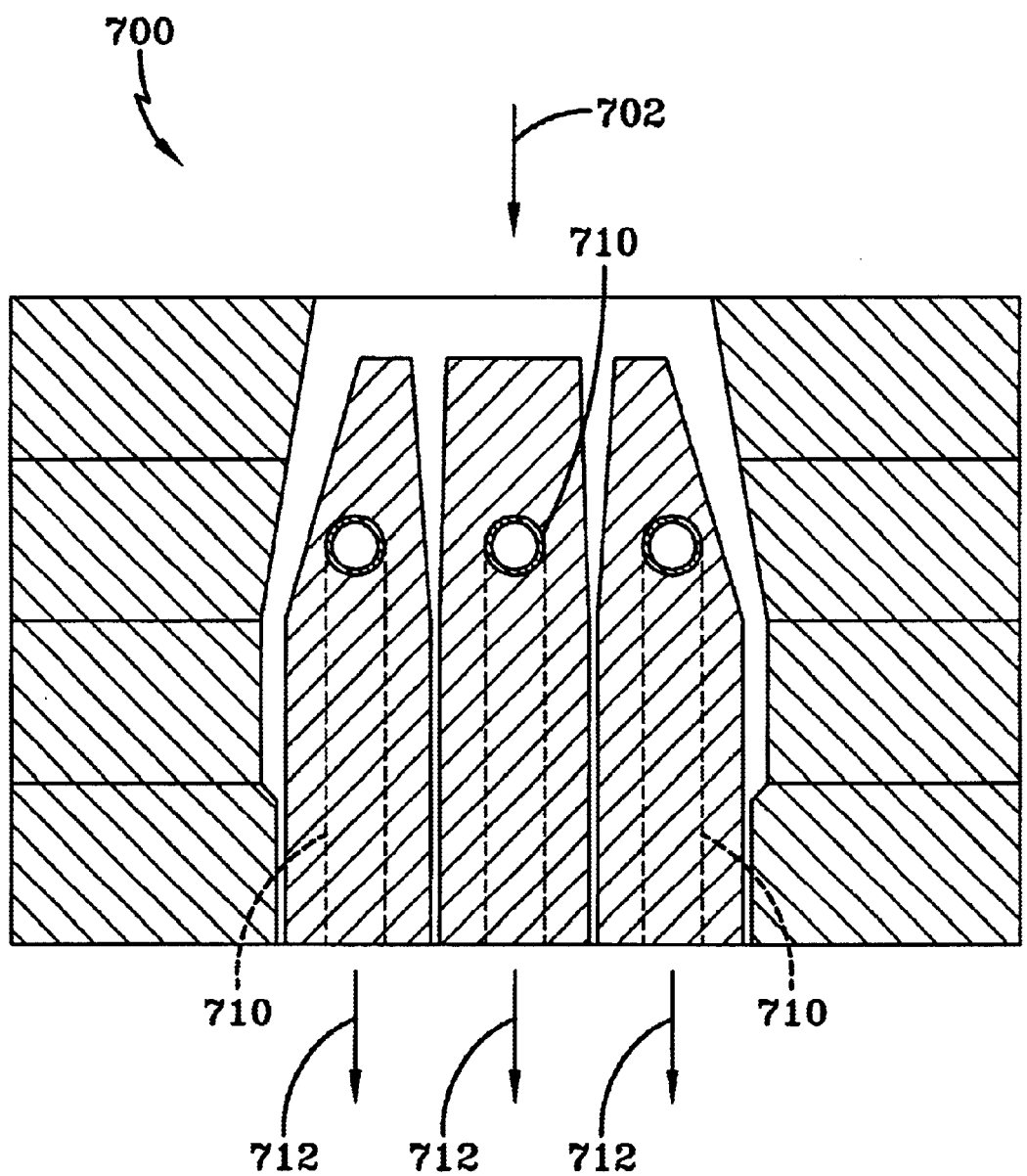
FIG. 8 is a cross sectional view from a top side angle of the die system of FIG. 7.
Figure 9:
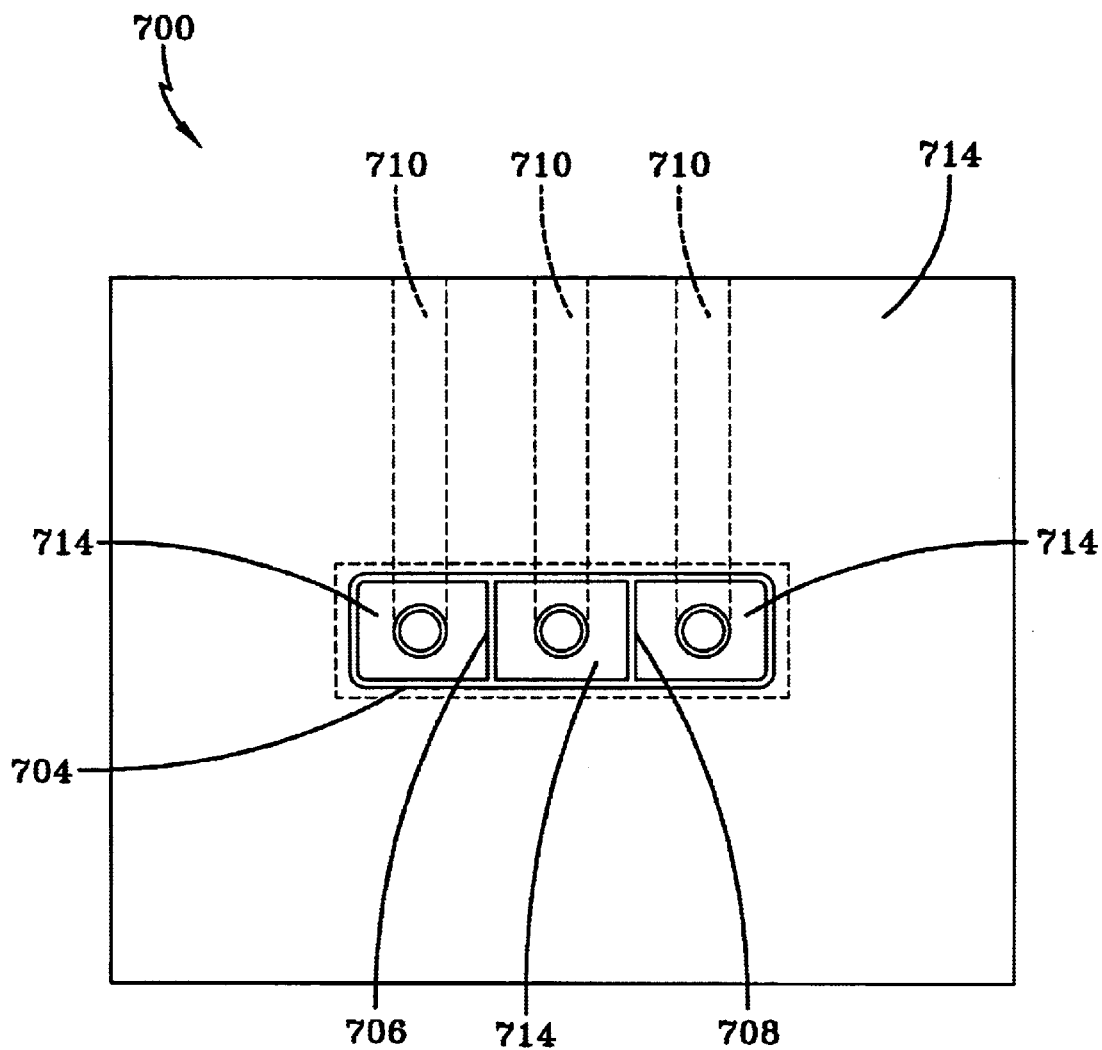
FIG. 9 is a cross sectional view from an exit side angle of the die system of FIG. 7.

FIGS. 7 through 9 show a cross sectional view of one example of a die system 700 that is configured to be in-line with an extruder. The extruded material flows through the die system in the direction indicated by arrow 702. In this example, the resultant extrudate 704 defines three hollow portions that are separated by webs 706 and 708. The cooling fluid enters the die system 700 through passages 710. In some embodiments, it should be recognized that a tube, conduit, or any other type of transfer device may extend through the passages 710 for directing the flow of the cooling fluid through the passages 710. The cooling fluid exits the die system 700 through passages 710 in the direction indicated by arrows 712. In such an embodiment, the passages 710 intersect the path of flow of the extruded material through the die system 700. In other words, the passages 710 intersect the flow channel in the die system 700.

The die system 700 may be heated to a sufficient level to facilitate extrusion and limit premature curing of the extrudate in the die system 700. In this example of an in-line system, the passages 710 actually extend through the die system 700, intersecting the path of flow of the extruded material through the die system 700. In such embodiments, it may be preferable to limit cooling of the die system 700 by the cooling fluid in the passages 710. Accordingly, the passages 710 may be insulated by a suitable material. For example, the passages 710 may be lined with ceramic insulation, putty ceramics, or any other similar, suitable, or conventional insulating material in order to limit undesired heat loss by the die system 700. In fact, it should be recognized that the transfer device for the cooling fluid in any type of embodiment may be insulated in order to limit undesired cooling of surrounding items.

As best seen in the example of FIG. 9, the passages 710 may be substantially surrounded by die material 714 even where the passages 710 intersect the path of flow of the extruded material. In this manner, direct contact between the extruded material and the passages 710 may be avoided, if desired. The die material 714 surrounding the passages 710 may be heated to facilitate the extrusion process. Also, air gaps may be provided between the die material 714 and the passages 710 for additional insulation.

Any desired cooling fluid may be used in the present invention. The cooling fluid, e.g., gas or liquid, may have a temperature below about 80 degrees Fahrenheit, more preferably below about 68 degrees Fahrenheit, still more preferably below about 32 degrees Fahrenheit, even more preferably below about minus 100 degrees Fahrenheit. On the other hand, the temperature may be above about minus 325 degrees Fahrenheit, more preferably above about minus 300 degrees Fahrenheit, still more preferably above about minus 275 degrees Fahrenheit, even more preferably above about minus 250 degrees Fahrenheit. However, in some embodiments of the present invention, the cooling fluid may be above about 80 degrees Fahrenheit or below about minus 325 degrees Fahrenheit. Examples of the cooling fluid are air and water. Another example of the cooling fluid is gas or vapor that is produced from a cryogenic fluid. For instance, a cryogenic fluid may have a temperature below about minus 250 degrees Fahrenheit. Examples of cryogenic fluids include, but are not limited to, liquid oxygen, liquid nitrogen, liquid neon, liquid hydrogen, liquid helium, and other similar, suitable, or conventional cryogenic fluids.

In addition to the temperature, the velocity of the cooling fluid may also impact its effectiveness. By selecting a suitable velocity and temperature of the cooling fluid, the inventors have discovered that an entire product can be thoroughly cooled just by injecting the cooling fluid into a hollow portion of the product. The velocity of the cooling fluid may be greater than about 10 miles per hour, more preferably greater than about 40 miles per hour, and it may be less than about 100 miles per hour, more preferably less than about 50 miles per hour. However, it should be recognized that the velocity of the cooling fluid may be less than about 10 miles per hour or greater than about 100 miles per hour in some embodiments.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for cooling a product, said method comprising:
   providing a die, said die having a passage lined with an insulating material;
   extruding a material through said die to form said product, said product having a hollow;
   directing a cooling fluid through said passage; and
   releasing said cooling fluid in said hollow of said product as said product exits said die.

2. The method of claim 1 wherein said insulating material is selected from the group consisting of ceramic insulation and putty ceramics.

3. The method of claim 1 wherein said material is a cellulosic/polymer composition.

4. The method of claim 1 wherein said cooling fluid has a temperature between about 80 degrees Fahrenheit and about minus 325 degrees Fahrenheit.

5. The method of claim 4 wherein said cooling fluid has a temperature between about 68 degrees Fahrenheit and about minus 300 degrees Fahrenheit.

6. The method of claim 5 wherein said cooling fluid has a temperature between about 32 degrees Fahrenheit and about minus 275 degrees Fahrenheit.

7. The method of claim 6 wherein said cooling fluid has a temperature between about minus 100 degrees Fahrenheit and about minus 250 degrees Fahrenheit.

8. The method of claim 1 wherein said cooling fluid is selected from liquid oxygen, liquid nitrogen, liquid neon, liquid hydrogen, and liquid helium.

9. The method of claim 1 wherein said cooling fluid is selected from the group selected from liquids, gases, and vapors.

10. The method of claim 1 wherein said die is in-line with an extruder.

11. The method of claim 10 wherein said passage intersects a path of flow of said material through said die.

12. A die adapted to be used with an extruder to form a product having a hollow portion, said die comprising:

- a flow channel adapted to be in fluid communication with said extruder such that an extruded material is forced through said flow channel to form said product; and
- a passage extending through said die, said passage adapted to be in fluid communication with a source of a cooling fluid, said passage lined with an insulating material;

wherein said passage is adapted to release said cooling fluid in said hollow of said product as said product exits said flow channel.

13. The die of claim 12 wherein said insulating material is selected from the group consisting of ceramic insulation and putty ceramics.

14. The die of claim 12 wherein said die is adapted to be in-line with said extruder.

15. A die adapted to be used with an extruder to form a product having a hollow portion, said die comprising:

- a flow channel adapted to be in fluid communication with said extruder such that an extruded material is forced through said flow channel to form said product; and
- a passage extending through said die and intersecting said flow channel, said passage adapted to be in fluid communication with a source of a cooling fluid, said passage lined with an insulating material;

wherein said passage is adapted to release said cooling fluid in said hollow of said product as said product exits said flow channel.

16. The die of claim 15 wherein said insulating material is selected from the group consisting of ceramic insulation and putty ceramics.

* * * * *

UNITED STATES PATENT AND TRADEMARK OFFICE
CERTIFICATE OF CORRECTION

PATENT NO.    : 6,708,504 B2                                          Page 1 of 1
DATED         : March 23, 2004
INVENTOR(S)   : Brandt et al.

It is certified that error appears in the above-identified patent and that said Letters Patent is hereby corrected as shown below:

Title page,
Item [56], References Cited, OTHER PUBLICATIONS, please delete "Fiberloc POlymer Composites, B.F. Goodrich, Geon Vinyl Division, section 1, pp. 2-15." and insert -- Fiberloc Polymer Composites, B.F. Goodrich, Geon Vinyl Division, section 1, pp. 2-15. --; please delete "From Sweden: Extruded Interior Trim Made of PVC and Wood Flour, Plastic Building Contruction, vol. 9 No. 5, 1986, pp. 5-6." and insert -- From Sweden: Extruded Interior Trim Made of PVC and Wood Flour, Plastic Building Construction, vol. 9 no. 5, 1986, pp. 5-6. --; and please delete "Klason et al., The Efficiency of Cellulosic Fillers in Common Thermoplastics. Part 1 Filling without Processing Aids or Coupling Agents, Polymeric Materials, 1984, vol. 10, pp. 159-187." and insert -- Klason et al., The Efficiency of Cellulosic Fillers in Common Thermoplastics. Part 1. Filling without Processing Aids or Coupling Agents, Polymeric Materials, 1984, vol. 10, pp. 159-187. --.

Signed and Sealed this

Twenty-fifth Day of May, 2004

JON W. DUDAS
*Acting Director of the United States Patent and Trademark Office*